(12) United States Patent
Yang

(10) Patent No.: US 6,478,531 B1
(45) Date of Patent: Nov. 12, 2002

(54) ARTICLE TRANSFER APPARATUS

(75) Inventor: Soo-Sang Yang, Suwon (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 6 days.

(21) Appl. No.: 09/629,853

(22) Filed: Aug. 1, 2000

(30) Foreign Application Priority Data

Feb. 26, 2000 (KR) .......................................... 2000-9590

(51) Int. Cl.[7] ............................................... B25J 17/00
(52) U.S. Cl. ........................ 414/744.3; 901/15; 901/26; 74/490.05
(58) Field of Search ........................... 414/744.5, 744.3; 901/26, 15; 74/490.01, 490.05, 423

(56) References Cited

U.S. PATENT DOCUMENTS 4,984,959 A * 1/1991 Kato ........................ 901/26 X 5,993,142 A 11/1999 Genov et al.

* cited by examiner

Primary Examiner—Donald W. Underwood

(57) ABSTRACT

An article transfer apparatus suitable for an operation requiring a large vertical working distance. The apparatus includes a first link driven by a motor, at least one second link coupled to the first link, and a mounting member coupled to the last one of the second link and loaded with an article to transfer. The individual links are pivotally moved using a combination of a supporting shaft, a rotating shaft and a swiveling shaft which are provided on the previous link, and the mounting member is moved upward by the shafts provided on the last link. Bevel gears are provided on the ends of the supporting shaft and the swiveling shaft and on both ends of the rotating shaft, and engaged with one another. The gear ratio between the bevel gear of the rotating shaft and that of the swiveling shaft is 2:1 on the first link and 1:2 on the last link. The other bevel gears are engaged with each other at a gear ratio of 1:1. According to these gear ratios, the individual links are moves upward along a same axis and the mounting member is moved while maintained in parallel with the horizontal plane.

10 Claims, 8 Drawing Sheets

ARTICLE TRANSFER APPARATUS

BACKGROUND OF THE INVENTION

1. Field of the Invention

The present invention relates to an article transfer apparatus and, more particularly, to an article transfer apparatus suitable to vertically move an article such as wafer, panel or computer hard disc to a desired position.

2. Description of the Related Art

Generally, in the manufacturing process of a semiconductor device or electronic appliance, there is a need of an apparatus equipped with an arm that is designed to make a horizontal or vertical motion in order to move a wafer or hard disc to a desired position. FIG. 1 illustrates an example of the conventional apparatus for moving an article in the vertical direction, which is disclosed in U.S. Pat. No. 5,993,142.

Referring to FIG. 1, the apparatus comprises: a plurality of lead screws 2 and a driving motor (not shown) mounted on a base 1; a plurality of vertical structures 3 each having a hollow to receive the individual lead screws 2; an elevator 4 provided at the bottom end of the individual vertical structures 3 and engaged with the lead screws 2; a flange 5 provided at the top end of the individual vertical structures 3; a link L1 disposed between the vertical structures 3 and provided on the top of the flange 5; links L2 and L3 connected in series to the one end of the link L1; and a motor 6 and an end effector 7 connected to the end of the link L3.

Once the driving motor (not shown) mounted on the base 1 operates, the lead screws 2 associated with the motor via a belt is turned so that the elevators 4 engaged with the lead screws 2 are moved up or down depending on the direction of rotation of the motor. The vertical structures 3 correspondingly make an up-and-down motion in a telescopic manner, thereby moving an article placed on the end effector 7 to a desired position.

Such a conventional apparatus as constructed above, however, has the individual vertical structures vertically climbing in a telescopic manner along the lead screws and thus occupies a vertical space as high as the height of the lead screws even in the off state. It is thus disadvantageous in that the apparatus has a non-conveyable region as large as the height of the lead screws in the off state.

Furthermore, the conventional apparatus requires excessively many parts substantially necessary to the structure and consists of complex connections between the motor, the lead screws and the vertical structures, which leads to an increase in the production cost and the manufacturing period.

SUMMARY OF THE INVENTION

Accordingly, an object of the present invention to solve the problems is to provide an article transfer apparatus having a simple structure and operational mechanism, and requiring a short vertical working distance in a non-operated state.

To achieve the above object, there is provided an article transfer apparatus including: a base; a supporting shaft fixed on the base; a first link having one end pivotally coupled to the supporting shaft; a second link having one end pivotally coupled to the other end of the first link; a mounting member coupled to the second link and loadable with an article to be transferred; a driving motor for pivotally moving the first link with a swiveling force; a rotating shaft rotatably provided along the first link and rotated by the swiveling force of the first link; and a swiveling shaft having one end fixed on the one end of the second link, and the other end coupled to the rotating shaft of the first link, the swiveling shaft receiving the swiveling force of the rotating shaft and pivotally moving the second link.

A rotating bevel gear is provided on both ends of the rotating shaft, and a fixed bevel gear is provided on the one end of the supporting shaft and is engaged with the rotating bevel gear provided on the one end of the rotating shaft. And, a swiveling bevel gear is provided on the other end of the swiveling shaft and is engaged with the rotating bevel gear provided on the other end of the rotating shaft. Thus the pivotal motion of the first link causes the rotating shaft to be turned, and the swiveling force of the rotating shaft pivotally moves the swiveling shaft coupled to the second link, thereby pivotally moving the second link.

The rotating shaft includes: a first sub shaft having both ends each provided with a bevel gear, and the one end thereof engaged with the fixed bevel gear of the supporting shaft; a second sub shaft having both ends each provided with a bevel gear, and the one end thereof engaged with the swiveling bevel gear of the swiveling shaft; and a switching shaft rotatably mounted in the first link and having a rotating bevel gear concurrently engaged with both the bevel gears provided on the other ends of the first and second sub shafts.

Thus the pivotal upward or downward motion of the first link causes the second link to pivotally move in the same direction, i.e., upward or downward.

The rotating bevel gear of the switching shaft is engaged with the bevel gears of the first and second sub shafts at a gear ratio of 1:1, and the bevel gear of the second sub shaft is engaged with the bevel gear of the swiveling shaft at a gear ratio of 2:1. Accordingly, the swiveling angle of the second link is double the swiveling angle of the first link, so that both ends of the individual links are moved upward along the same axis.

The article transfer apparatus further includes: a second supporting shaft having one end fixed on the first link and the other end extending to the second link for pivotally supporting the second link and being coaxial with the swiveling shaft fixed on the second link; a second rotating shaft mounted along the second link to be rotated by the swiveling force of the second link; and a second swiveling shaft having one end fixed on the mounting member and the other end coupled to the second rotating shaft of the second link, the second swiveling shaft receiving the swiveling force of the second rotating shaft and pivotally moving the mounting member.

A rotating bevel gear is provided on both ends of the second rotating shaft, and a fixed bevel gear is provided on the other end of the second supporting shaft and engaged with the bevel gear fixed on the adjacent one end of the second rotating shaft. And, a swiveling bevel gear is provided on the other end of the second swiveling shaft and engaged with the bevel gear fixed on the adjacent other end of the second rotating shaft. Thus the pivotal motion of the second link causes the second rotating shaft to be turned, and the turning force of the second rotating shaft pivotally moves the second swiveling shaft together with the mounting member.

The bevel gear of the second rotating shaft provided on the second link is engaged with the bevel gear of the second supporting shaft fixed on the first link at a gear ratio of 1:1, and a bevel gear of the second rotating shaft is engaged with the bevel gear of the second swiveling shaft fixed on the mounting member at a gear ratio of 1:2. As a result, the swiveling angle of the mounting member is a half of the swiveling angle of the second link, so that the mounting member can be ascending while maintaining in parallel with the horizontal plane.

In another embodiment of the present invention, the second link includes a plurality of sub links serially coupled in the same manner as the engagement structure made between the first and second links, and the mounting member is provided on the final sub link. This elongates the vertical transfer distance of the mounting member.

DETAILED DESCRIPTION OF THE PREFERRED EMBODIMENTS

Hereinafter, preferred embodiments of the present invention will be described in detail with reference to the accompanying drawings.

Figure 1:
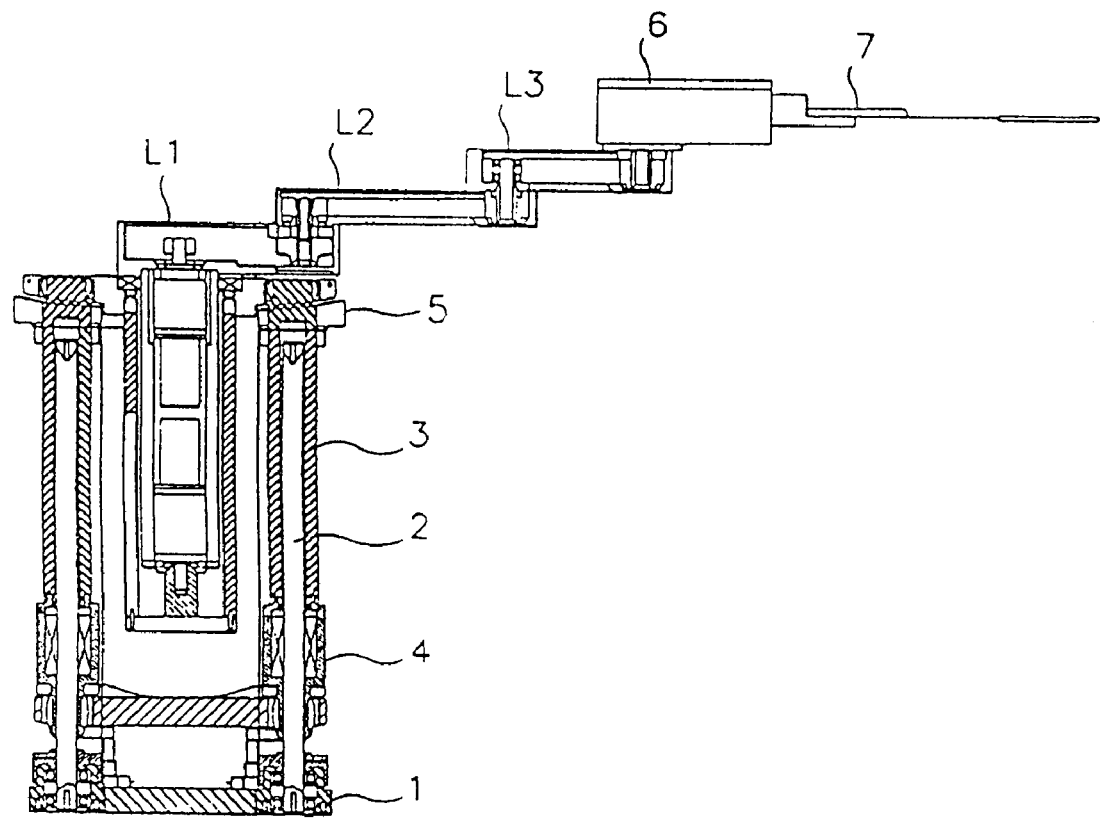
FIG. 1 is a longitudinal sectional view of an article transfer apparatus according to a prior art.
Figure 2:
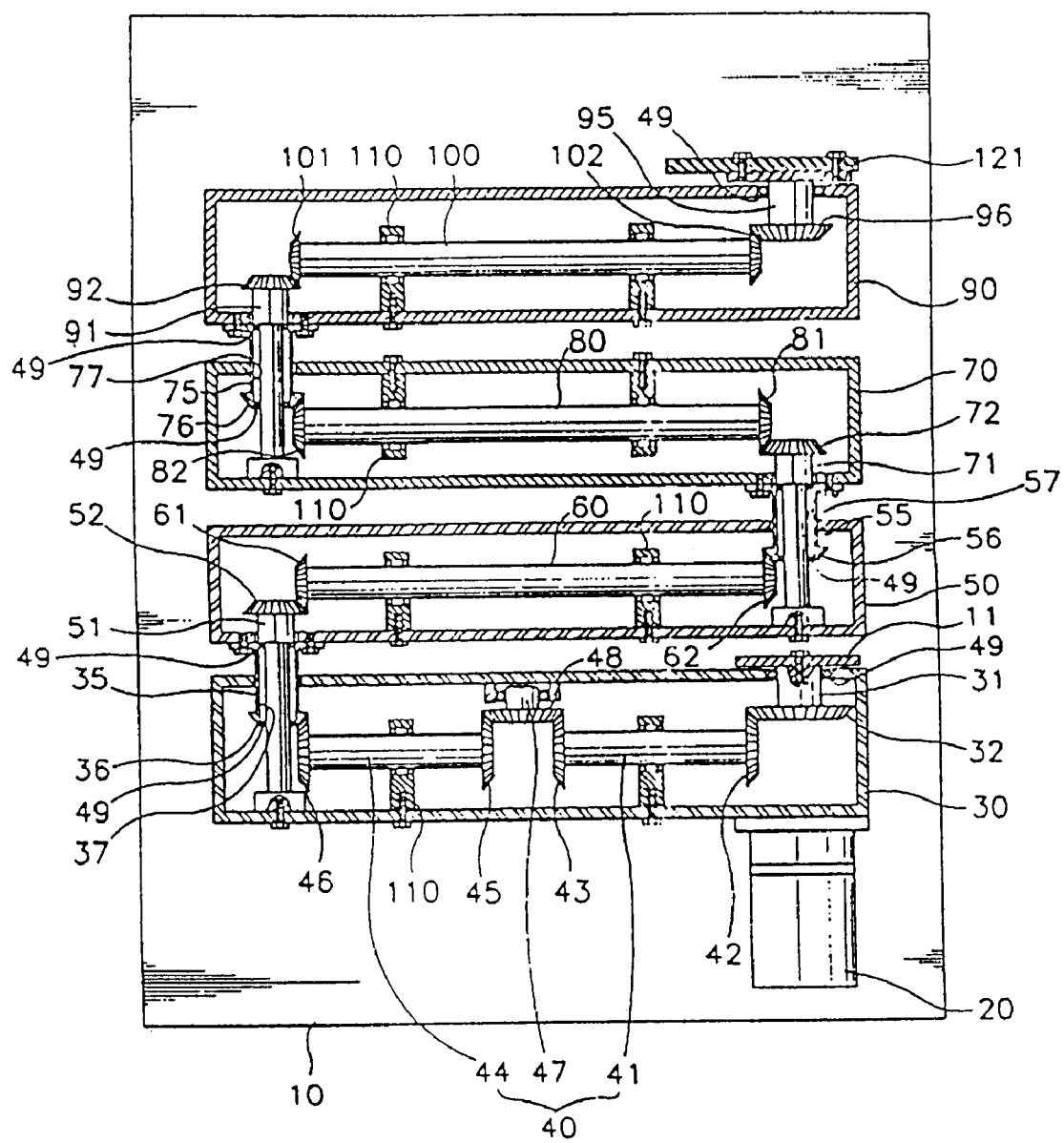
FIG. 2 is a transversal sectional view of an article transfer apparatus in a non-operated state according to a first embodiment of the present invention.
Figure 3:
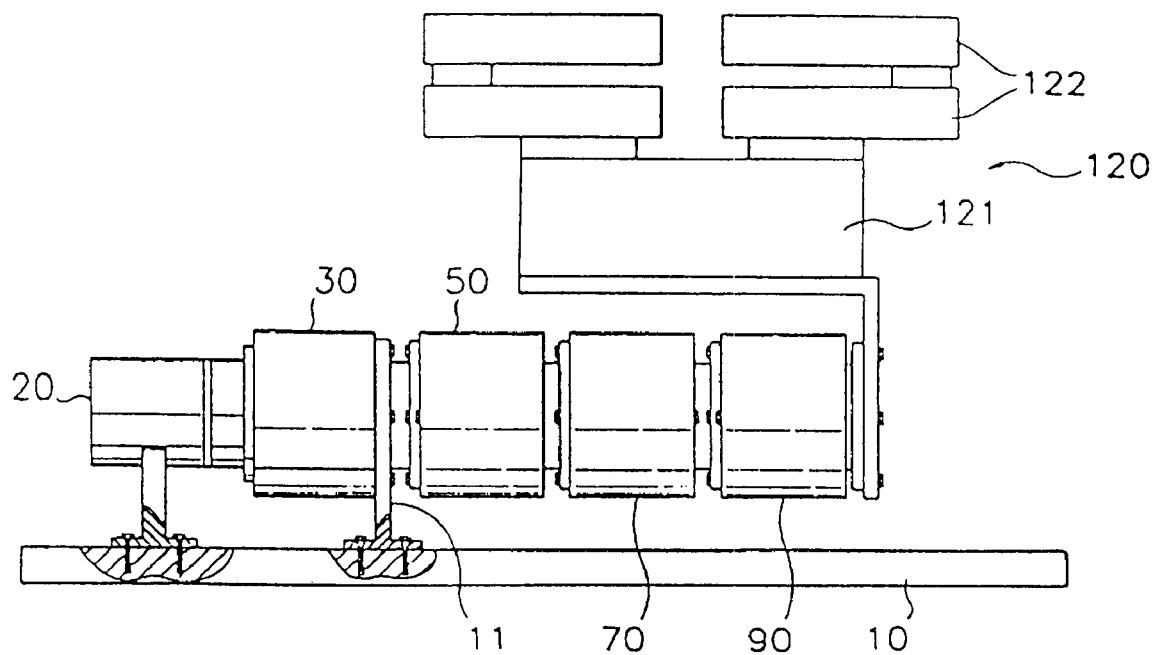
FIG. 3 is a side view of the article transfer apparatus shown in FIG. 2.

FIG. 2 is a transversal sectional view of an article transfer apparatus in a non-operated state according to a first embodiment of the present invention, and FIG. 3 is a side view of the article transfer apparatus shown in FIG. 2.

As illustrated, the article transfer apparatus according to the first embodiment comprises: a base 10; a driving motor 20 fixed on the base 10 and including a reduction gear member (not shown); a first link 30 associated with the reduction gear member of the driving motor 20; second, third and fourth links 50, 70 and 90 sequentially connected in parallel to the first link 30; and a mounting member 120 having a swing arm 121 and a plurality of conveying arms 122 and associated with the fourth link 90. The links 30, 50, 70 and 90 have a hexahedral or cylindrical structure provided with an inner space.

Although it is expediently assumed that four links are provided in the present invention, the number of links may be at least two within the scope of the present invention. A description on an article transfer apparatus with two links will be given later in connection to the second embodiment of the present invention.

As a driving shaft (not shown) of the reduction gear member is associated with the exterior side of a front portion of the first link 30, the driving motor 20 fixed on the base 10 causes the first link 30 to be pivotally moved with respect to the front end thereof. An AC servomotor may be used as the driving motor 20.

The first link 30 is internally provided with a supporting shaft 31, a swiveling shaft 35, and a rotating shaft 40, which are to pivotally move the second link 50 arranged in parallel with the first link 30.

The supporting shaft 31, piercing the first link 30, is disposed opposite to the driving motor 20 and fixedly associated with a bracket 11 fixed on the base 10. A fixed bevel gear 32 is provided at the end of the supporting shaft 31, and a bearing member 49 is provided at the portion of the supporting shaft 31 piercing the first link 30, thereby pivotally supporting the first link 30.

The swiveling shaft 35, piercing the first link 30, is disposed at a rear portion of the first link 30 and fixed on the exterior side of a front portion of the second link 50, so that it pivotally moves in engagement with the second link 50.

A swiveling bevel gear 36 is provided at the end of the swiveling shaft 35. The swiveling shaft 35 is internally provided with a hollow portion 37.

The rotating shaft 40 has first and second sub shafts 41 and 44, and a switching shaft 47 connecting the first and second sub shafts 41 and 44 to switch the rotational direction.

The switching shaft 47 is pivotally provided on the first link 30 and a rotating bevel gear 48 is formed at the end of the switching shaft 47.

The first sub shaft 41 has both ends provided with bevel gears 42 and 43, which are engaged with the fixed bevel gear 32 of the supporting shaft 31 and the rotating bevel gear 48 of the switching shaft 47, respectively. The second sub shaft 44 has both ends provided with bevel gears 45 and 46, which are engaged with the rotating bevel gear 48 of the switching shaft 47 and the swiveling bevel gear 36 of the swiveling shaft 35, respectively.

The first link 30 is internally provided with a plurality of shaft-receiving members 110 in order to rotatably support the first and second sub shafts 41 and 44. These shaft-receiving members 110 are bolted to the first link 30 and provided with bearings at a portion thereof pierced by the first and second sub shafts 41 and 44, thereby rotatably supporting the sub shafts 41 and 44.

The bevel gear 32 of the supporting shaft 31, the bevel gears 42, 43 and 45 of the first and second sub shafts 41 and 44, and the bevel gear 48 of the switching shaft 47 are engaged with one another at a gear ratio of 1:1. The bevel gear 46 of the second sub shaft 44 is engaged with the bevel gear 36 of the swiveling shaft 35 at a gear ratio of 2:1.

Figure 4:
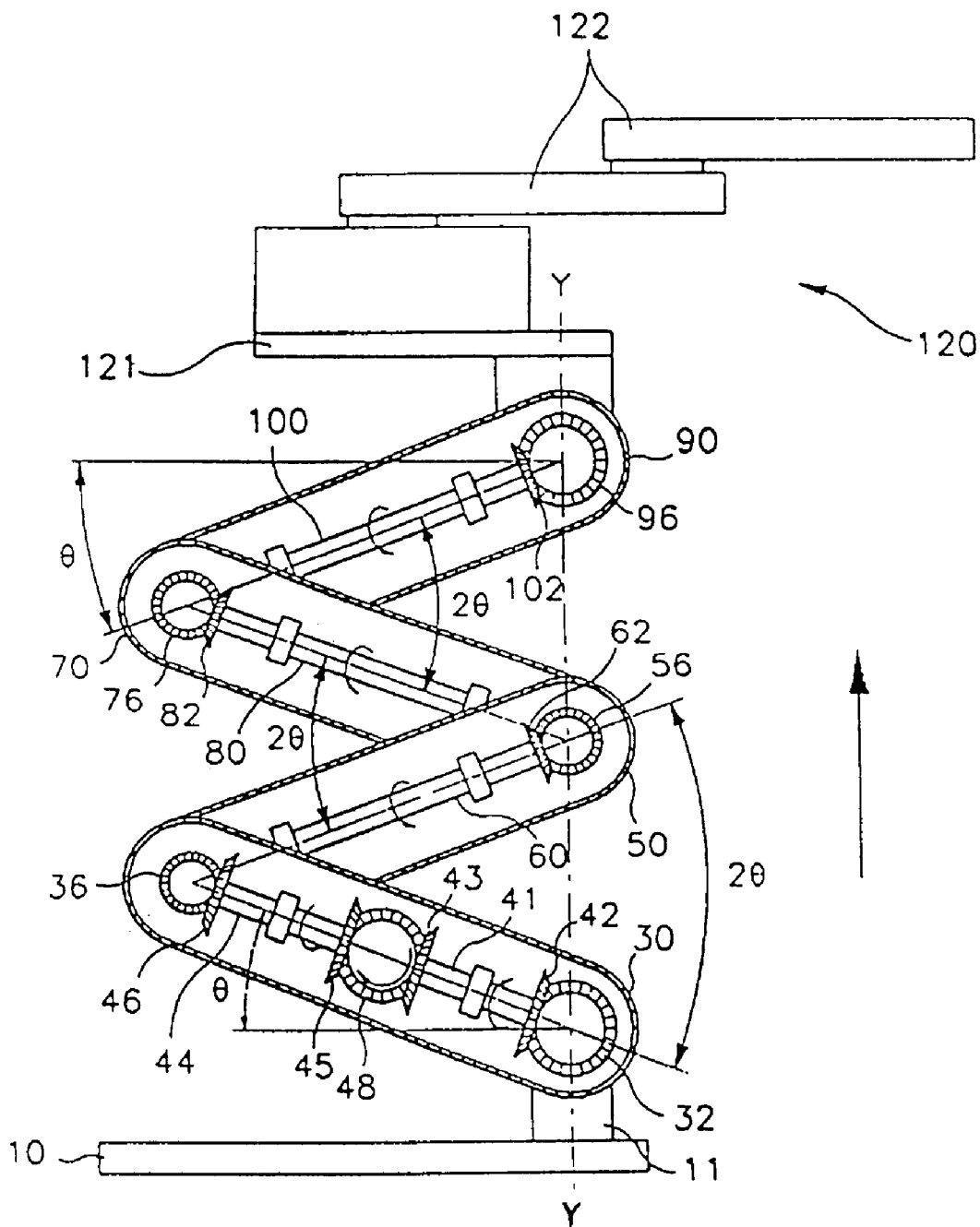
FIG. 4 is a front view explaining a vertical ascending operation of the article transfer apparatus according to the first embodiment of the present invention.

According to these gear ratios, when the first link 30 turns by $\theta$, the second link 50 pivotally moves by $2\theta$, as illustrated in FIG. 4.

In a similar way to the first link 30, the second link 50 is internally provided with a supporting shaft 51, a swiveling shaft 55, and a rotating shaft 60, which are to pivotally move the third link 70 arranged in parallel with the second link 50.

The supporting shaft 51, piercing the second link 50 and the swiveling shaft 35 of the first link 30, is disposed at a front portion of the second link 50 and bolted to the inside of the first link 30. A fixed bevel gear 52 is provided at the end of the supporting shaft 51, and the bearing member 49 is provided at the portion of the supporting shaft 51 piercing the second link 50 and the swiveling shaft 35 of the first link 30, thereby pivotally supporting the second link 50.

The swiveling shaft 55, piercing the second link 50, is disposed at a rear portion of the second link 50 and fixed on the exterior side of a front portion of the third link 70, so that it pivotally moves in engagement with the third link 70.

A swiveling bevel gear 56 is provided at the end of the swiveling shaft 55. The swiveling shaft 55 is internally provided with a hollow portion 57.

Contrary to the case of the first link 30, the shaft 60 has a single long rod-shaped structure. On both ends of the shaft 60 are provided rotating bevel gears 61 and 62, which are engaged with the bevel gear 52 of the supporting shaft 51 and the bevel gear 56 of the swiveling shaft 55, respectively.

The second link 50 is also internally provided with a plurality of shaft-receiving members 110 similar to those of the first link 30 in order to pivotally support the shaft 60.

The bevel gear 52 of the supporting shaft 51, the bevel gears 61 and 62 of the shaft 60, and the bevel gear 56 of the swiveling shaft 55 are engaged with one another at a gear ratio of 1:1. According to this gear ratio, when the second link 50 turns by 2θ, the third link 70 also pivotally moves by 2θ, as illustrated in FIG. 4.

In a similar way to the second link 50, the third link 70 is internally provided with a supporting shaft 71, a swiveling shaft 75, and a rotating shaft 80, which are to pivotally move the fourth link 90 arranged in parallel with the third link 70.

The supporting shaft 71, piercing the third link 70 and the swiveling shaft 75 of the second link 50, is disposed at a front portion of the third link 70 and bolted to the inside of the second link 50. A fixed bevel gear 72 is provided at the end portion of the supporting shaft 71, and the bearing member 49 is provided at the portion of the supporting shaft 71 piercing the third link 70 and the swiveling shaft 55 of the second link 50, thereby pivotally supporting the third link 70.

The swiveling shaft 75, piercing the third link 70, is disposed at a rear portion of the third link 70 and fixed on the exterior side of a front portion of the fourth link 90, so that it pivotally moves in engagement with the fourth link 90.

A swiveling bevel gear 76 is provided at the end of the swiveling shaft 75. The swiveling shaft 75 is internally provided with a hollow portion 77.

On both ends of the rotating shaft 80 are provided rotating bevel gears 81 and 82, which are engaged with the bevel gear 72 of the supporting shaft 71 and the bevel gear 76 of the swiveling shaft 75, respectively. The third link 70 is also internally provided with a plurality of shaft-receiving members 110 in order to pivotally support the rotating shaft 80. The bevel gear 72 of the supporting shaft 71, the bevel gears 81 and 82 of the rotating shaft 80, and the bevel gear 76 of the swiveling shaft 75 are engaged with one another at a gear ratio of 1:1. According to this gear ratio, when the third link 70 turns by 2θ, the fourth link 90 also pivotally moves by 2θ, as illustrated in FIG. 4.

In a similar way to the second and third links 50 and 70, the fourth link 90 is internally provided with a supporting shaft 91, a swiveling shaft 95, and a rotating shaft 100, which are to vertically move the mounting member 120 associated with a rear portion of the fourth link 90, while maintaining the mounting member 120 in parallel with the horizontal plane.

The supporting shaft 91, piercing the fourth link 90 and the swiveling shaft 75 of the third link 70, is disposed at a front portion of the fourth link 90 and bolted to the inside of the third link 70. A fixed bevel gear 92 is provided at the end of the supporting shaft 91, and the bearing member 49 is provided at the portion of the supporting shaft 91 piercing the fourth link 90 and the swiveling shaft 75 of the third link 70, thereby pivotally supporting the fourth link 90.

The swiveling shaft 95, piercing the fourth link 90, is disposed at a rear portion of the fourth link 90 and fixed on the swing arm 121 of the mounting member 120, so that it pivotally moves in engagement with the mounting member 120. A swiveling bevel gear 96 is provided at the end of the swiveling shaft 95, and the bearing member 49 is provided at the portion of the swiveling shaft 95 piercing the fourth link 90, thereby pivotally supporting the mounting member 120.

On both ends of the rotating shaft 100 are provided rotating bevel gears 101 and 102, which are engaged with the bevel gear 92 of the supporting shaft 91 and the bevel gear 96 of the swiveling shaft 95, respectively. The fourth link 90 is also internally provided with a plurality of shaft-receiving members 110 in order to pivotally support the rotating shaft 100. The bevel gear 92 of the supporting shaft 91 is engaged with the bevel gear 101 of the rotating shaft 100 at a gear ratio of 1:1, while the bevel gear 102 of the rotating shaft 100 is engaged with the bevel gear 96 of the swiveling shaft 95 at a gear ratio of 1:2. According to these gear ratios, when the fourth link 90 turns by 2θ, the mounting member 120 pivotally moves only by θ, while maintained in parallel with the horizontal plane, as illustrated in FIG. 4.

Figure 5:
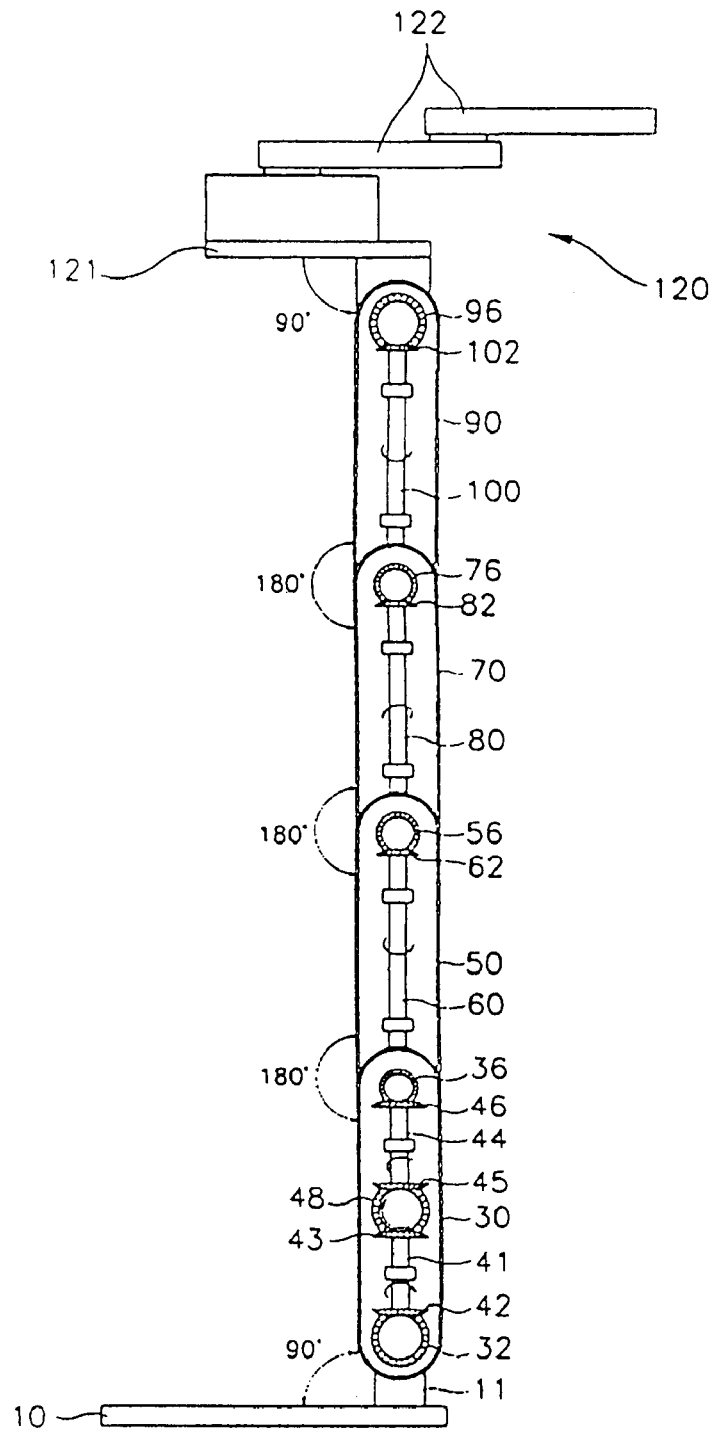
FIG. 5 is a front view showing the article transfer apparatus extended to the maximum vertical height according to the first embodiment of the present invention.
Figure 6:
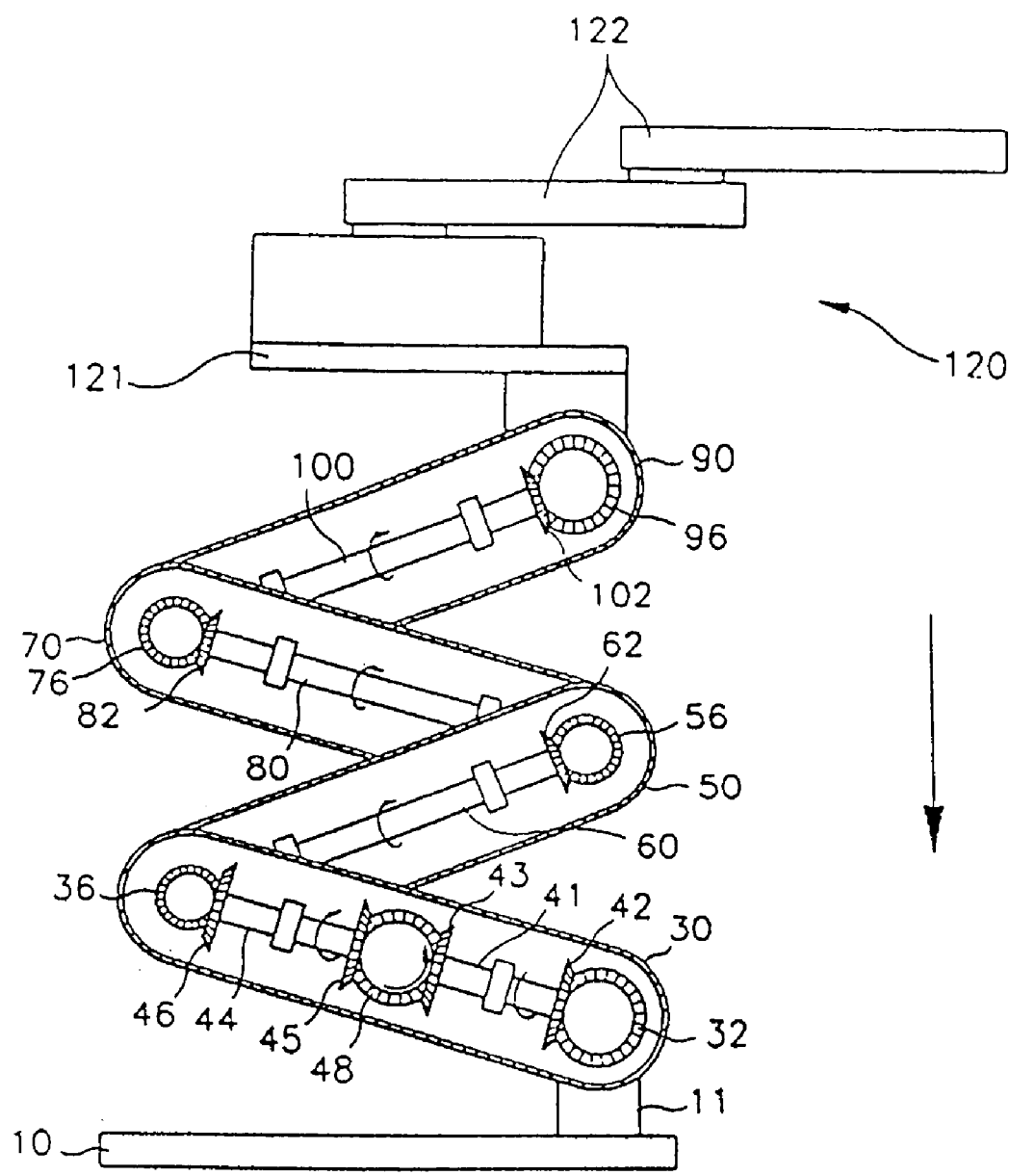
FIG. 6 is a front view explaining a vertical descending operation of the article transfer apparatus according to the first embodiment of the present invention.

FIGS. 4, 5 and 6 illustrate a climbing and descending operation of the above-structured article transfer apparatus according to the first embodiment of the present invention.

Now, a description will be given to the operation of the present invention with reference to the figures.

As shown in FIG. 4, when the driving motor 20 is driven in a direction to extend the links upward in order to move the mounting member 120 up to a desired height, the first link 30 connected to the reduction gear (not shown) pivotally moves upward by a predetermined angle (θ) corresponding to the desired height. Meanwhile, as the supporting shaft 31 is fixed on the base 10 by the bracket 11 (FIG. 2), the pivotal motion of the first link 30 causes the bevel gear 42 of the first sub shaft 41 to rotate along the bevel gear 32 of the supporting shaft 31 in a direction of the arrow shown in FIG. 4. The rotation of the first sub shaft 41 makes the switching shaft 47 turn in a direction of the arrow shown in FIG. 4 and the second sub shaft 44 turn in a reverse direction of the first sub shaft 41.

Due to the turning forces of the shafts 41, 44 and 47, the swiveling shaft 35 having the bevel gear 36 engaged with the bevel gear 46 of the second sub shaft 44 is rotated so that the second link 50 associated with the swiveling shaft 35 is pivotally moved upward with respect to the supporting shaft 51. The swiveling angle of the second link 50 is double (e.g., 2θ) the swiveling angle (e.g., θ) of the first link 30, since the bevel gear 46 of the second sub shaft 44 is engaged with the bevel gear 36 of the swiveling shaft 35 at a gear ratio of 2:1.

As the bevel gear 61 of the shaft 60 provided in the second link 50 is in engagement with the bevel gear 52 of the supporting shaft 61, the pivotal motion of the second link 50 causes the shaft 60 not only to pivotally move with the second link 50 but also to rotate in a direction of the arrow shown in FIG. 4. The turning force of the rotating shaft 60 is transferred to the bevel gear 56 of the swiveling shaft 55 engaged with the bevel gear 62 of the rotating shaft 60 so as to turn the swiveling shaft 55. This causes the third link 70 associated with the swiveling shaft 55 to pivotally move upward with respect to the supporting shaft 71. The swiveling angle of the third link 70 is equal to the swiveling angle (e.g., 2θ) of the second link 50, because the bevel gears of the second link 50 are engaged with one another at a gear ratio of 1:1.

The fourth link 90 makes a pivotal motion in the same manner as described above. That is, the pivotal motion of the third link 70 causes the shaft 80 provided in the third link 70 not only to pivotally move with the third link 70 but also to rotate in a direction of the arrow shown in FIG. 4. The turning force of the rotating shaft 80 rotates the swiveling shaft 75, which in turn causes the fourth link 90 associated with the swiveling shaft 75 to pivotally move upward with respect to the supporting shaft 91. The swiveling angle of the fourth link 90 is equal to the swiveling angle (e.g., 2θ) of the third link 70, since the bevel gears of the third link 70 are engaged with one another at a gear ratio of 1:1.

As the fourth link 90 makes a pivotal motion, the rotating shaft 100 provided in the fourth link 90 is turned in a direction of the arrow shown in FIG. 4 in the same manner as described above. The turning force of the rotating shaft 100 is transferred to the swiveling shaft 95 via the bevel gear 102 of the rotating shaft 100 and the bevel gear 96 of the swiveling shaft 95 so as to turn the swing arm 121 of the mounting member 120 associated with the swiveling shaft 95, thereby pivotally moving the mounting member 120. The swiveling angle of the mounting member 120 is a half (e.g., θ) of the swiveling angle (e.g., 2θ) of the fourth link 90, because the bevel gear 92 is engaged with the bevel gear 101 at a gear ratio of 1:1 and the bevel gear 102 is engaged with the bevel gear 96 at a gear ratio of 1:2.

When ascending the individual links with the aforementioned structure and gear ratios, the end portions of the links move along the same axial line Y—Y. This maintains the postures of the links and the mounting member as illustrated in FIG. 4 even when the links are moved at whatever angle, so that the mounting member 120 can be moved upward in parallel with the horizontal plane.

FIG. 5 shows the article transfer apparatus of the invention extended to the maximum vertical height, in which the first link 30 and the mounting member 120 have a swiveling angle of 90° and the second, third and fourth links 50, 70 and 90 have a swiveling angle of 180°.

FIG. 6 shows the article transfer apparatus of the invention folded in a non-operated state after the completion of article conveyance. As the driving motor 20 rotates in a direction to descend the links, as indicated by the arrow of FIG. 6, the individual shafts are rotated in the reverse direction of FIG. 4 to move the links down.

Figure 7:
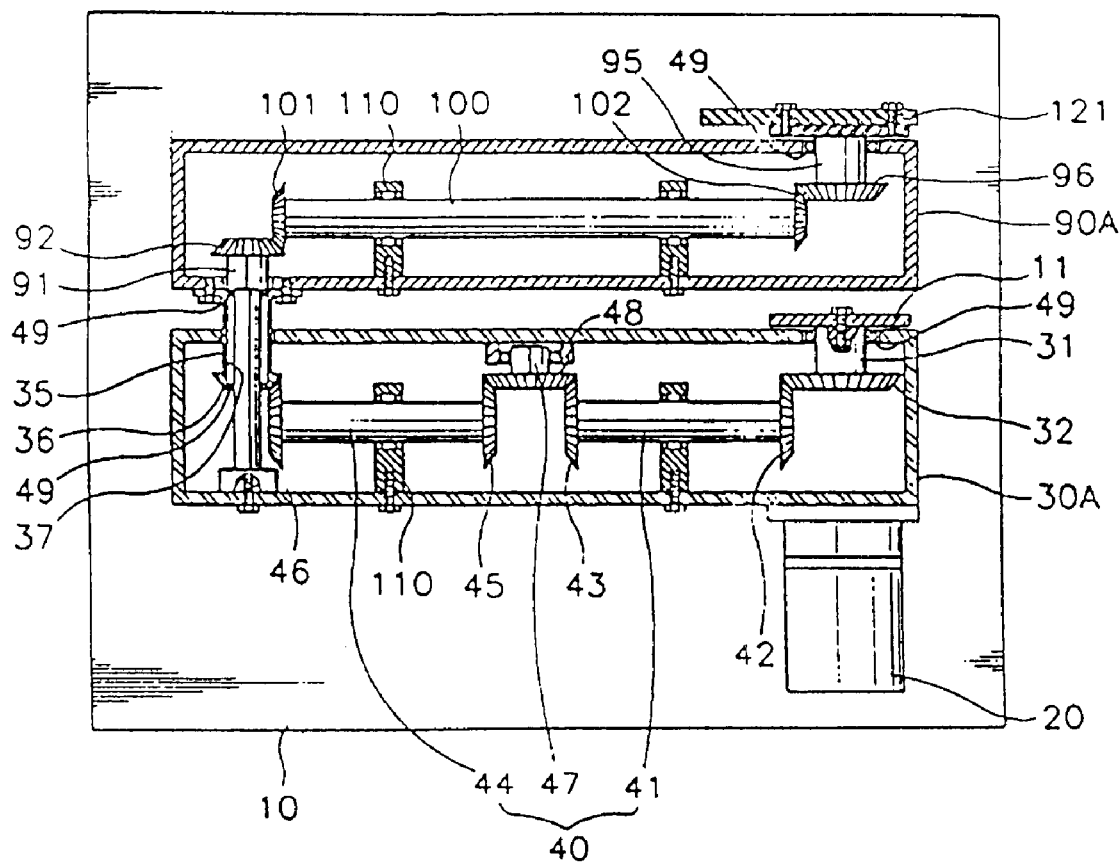
FIG. 7 is a transversal sectional view of an article transfer apparatus in a non-operated state according to a second embodiment of the present invention.
Figure 8:
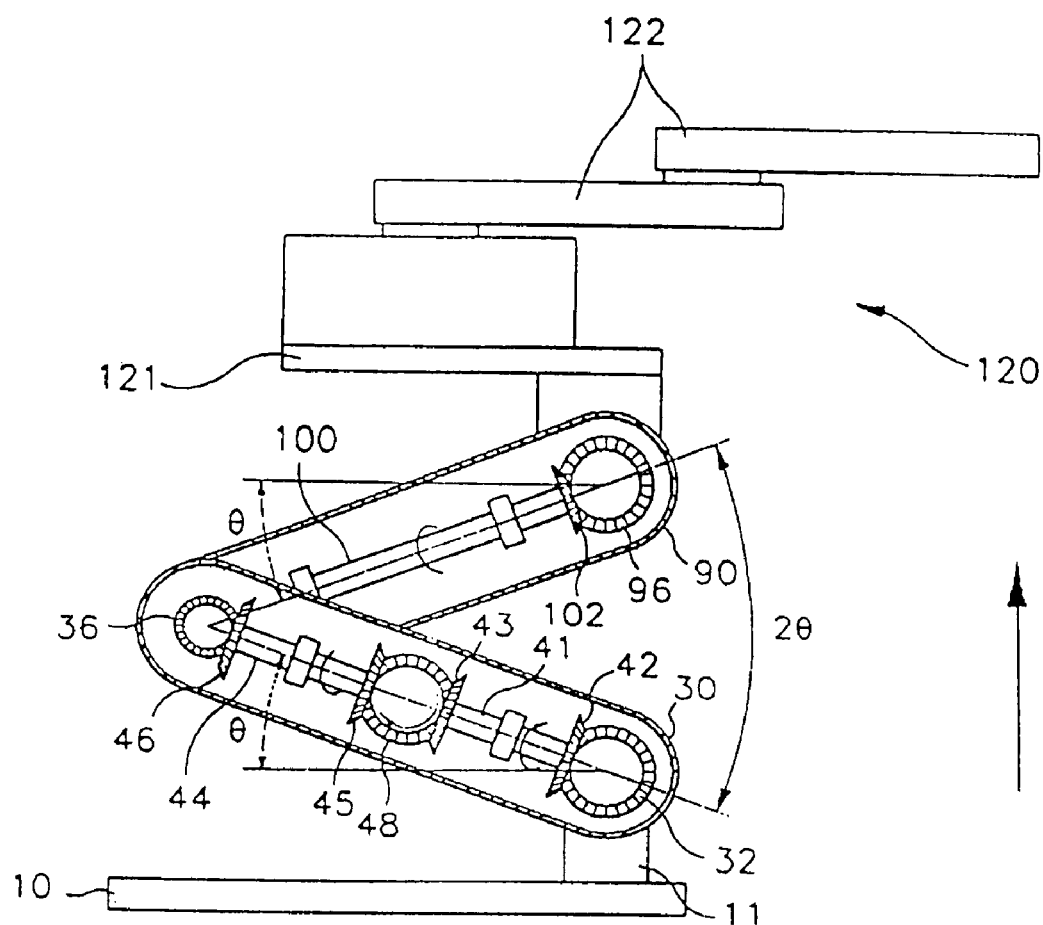
FIG. 8 is a front view explaining a vertical ascending operation of the article transfer apparatus according to the second embodiment of the present invention.

FIGS. 7 and 8 are illustrations of an article transfer apparatus according to a second embodiment of the present invention. This embodiment suggests that the article transfer apparatus of the invention can be implemented with at least two links. In FIG. 7, a first link 30A, internal shafts of the first link 30A, and gear ratios are analogous to the first link 30, the internal shafts of the link 30, and the gear ratios in FIG. 2, and a second link 90A, internal shafts of the second link 90A, and gear ratios are similar to the fourth link 90, the internal shafts of the link 90, and the gear ratios in FIG. 2. It is therefore to be noted that like reference numerals as used in the first embodiment denote the same components other than the links in the drawings.

FIG. 8 is an illustration corresponding to FIG. 4, in which the first and second links 30A and 90A are pivotally moved upward to make the mounting member 120 move upward in parallel with the horizontal plane. The operation of the article transfer apparatus in the second embodiment is analogous to that of the article transfer apparatus in the first embodiment and its description will be avoided.

As described above, the article transfer apparatus of the present invention has at least two links arranged in parallel and connected to be extendable and occupy less space for installation in a non-operated state, thus improving the operating efficiency and increasing the working area.

Furthermore, the article transfer apparatus has a structure with reduced complexity and a smaller number of parts, which may provide a contribution to the reduction of production cost and time.

What is claimed is:

1. An article transfer apparatus comprising:

a base;

a supporting shaft fixed on the base;

a first link having a first input end pivotally coupled to the supporting shaft and a first output end;

a second link having a second input end pivotally coupled to the first output end of the first link;

a mounting member coupled to the second link and which is loadable with an article to be transferred;

a driving motor for pivotally moving the first link with a swiveling force;

a rotating shaft rotatably provided along the first link, the rotating shaft being coupled to the supporting shaft so as to be rotated by the moving the first link caused by the swiveling force; and a swiveling shaft having one end fixed on the second input end of the second link, and the other end thereof coupled to the rotating shaft of the first link, the swiveling shaft receiving the swiveling force of the rotating shaft and pivotally moving the second link.

2. The article transfer apparatus as claimed in claim 1:

wherein a rotating bevel gear is provided on first and second ends of the rotating shaft;

wherein a fixed bevel gear is provided on a first end of the supporting shaft and is engaged with the rotating bevel gear provided on the adjacent first end of the rotating shaft; and wherein a swiveling bevel gear is provided on a second end of the swiveling shaft and is engaged with the rotating bevel gear provided on the adjacent second end of the rotating shaft.

3. The article transfer apparatus as claimed in claim 1:

wherein a fixed bevel gear is provided on a first end of the supporting shaft, wherein a swiveling bevel gear is provided on the other end of the swiveling shaft, and wherein the rotating shaft comprises:
   a) a first sub shaft having a first input end and a second output end each provided with a bevel gear, with the first input end thereof engaged with the fixed bevel gear on the first end of the supporting shaft;
   b) a second sub shaft having a first input end and a second output end each provided with a bevel gear, with the second output end thereof engaged with the swiveling bevel gear on the other end of the swiveling shaft; and
   c) a switching shaft rotatably mounted in the first link and having a rotating bevel gear concurrently engaged with the bevel gears provided on the output end of the first sub shaft and the input end of the second sub shaft.

4. The article transfer apparatus as claimed in claim 3, wherein the rotating bevel gear of the switching shaft is engaged with the bevel gears of the first and second sub shafts at a gear ratio of 1:1, and the bevel gear of the output end of the second sub shaft is engaged with the bevel gear of the swiveling shaft at a gear ratio of 2:1.

5. The article transfer apparatus as claimed in claim 1, wherein the first link comprises a shaft-receiving member for rotatably supporting the rotating shaft.

6. The article transfer apparatus as claimed in claim 1, further comprising a second supporting shaft coaxial with the swiveling shaft and having one end fixed on the first link and the other end extending to the second link, thereby rotatably supporting the second link.

7. The article transfer apparatus as claimed in claim 1, further comprising:
- a second supporting shaft having one end fixed on the first link and the other end extending to the second link for pivotally supporting the second link;
- a second rotating shaft mounted along the second link and which is rotated by the moving of the first link caused by the swiveling force; and
- a second swiveling shaft having one end fixed on the mounting member and the other end coupled to the second rotating shaft of the second link, the second swiveling shaft receiving the swiveling force of the second rotating shaft and pivotally moving the mounting member.

8. The article transfer apparatus as claimed in claim 7:
- wherein a rotating bevel gear is provided on both ends of the second rotating shaft,
- wherein a fixed bevel gear is provided on the other end of the second supporting shaft and is engaged with the bevel gear fixed on an adjacent first end of the second rotating shaft, and
- wherein a swiveling bevel gear is provided on the other end of the second swiveling shaft and engaged with the bevel gear fixed on an adjacent second end of the second rotating shaft.

9. The article transfer apparatus as claimed in claim 8, wherein the bevel gear of the second rotating shaft provided on the second link is engaged with a bevel gear of the second supporting shaft fixed on the first link at a gear ratio of 1:1, and the bevel gear of the second end of the second rotating shaft is engaged with the bevel gear of the second swiveling shaft fixed on the mounting member at a gear ratio of 1:2.

10. The article transfer apparatus as claimed in claim 1, wherein the second link includes a plurality of sub links serially coupled together, and the mounting member is provided on the final sub link.

* * * * *